United States Patent
Yang

(10) Patent No.: US 7,524,529 B2
(45) Date of Patent: Apr. 28, 2009

(54) METHOD FOR MAKING A LITHIUM MIXED METAL COMPOUND HAVING AN OLIVINE STRUCTURE

(75) Inventor: Chih-Wei Yang, Taipei (TW)

(73) Assignee: Aquire Energy Co., Ltd., Tapei (TW)

( * ) Notice: Subject to any disclaimer, the term of this patent is extended or adjusted under 35 U.S.C. 154(b) by 0 days.

(21) Appl. No.: 11/799,625

(22) Filed: May 2, 2007

(65) Prior Publication Data
US 2007/0207080 A1 Sep. 6, 2007

Related U.S. Application Data

(63) Continuation-in-part of application No. 11/222,569, filed on Sep. 9, 2005, now abandoned.

(51) Int. Cl.
C01B 25/26 (2006.01)
H01M 4/58 (2006.01)

(52) U.S. Cl. ............... 427/213; 252/502; 252/506; 252/507; 423/306; 429/221; 429/223; 429/224; 429/231.5; 429/231.95

(58) Field of Classification Search ........... 423/306; 427/213
See application file for complete search history.

(56) References Cited

U.S. PATENT DOCUMENTS

| | | | |
|---|---|---|---|
| 3,304,249 A * | 2/1967 | Katz ............... | 204/164 |
| 5,910,382 A | 6/1999 | Goodenough et al. ..... | 429/218.1 |
| 6,528,033 B1 | 3/2003 | Barker et al. ............ | 423/306 |
| 6,716,372 B2 | 4/2004 | Barker et al. ............ | 252/518.1 |
| 6,730,281 B2 | 5/2004 | Barker et al. ............ | 423/306 |
| 6,913,855 B2 * | 7/2005 | Stoker et al. ............ | 429/231.95 |
| 7,025,907 B2 * | 4/2006 | Kohzaki et al. .......... | 252/518.1 |
| 7,060,206 B2 * | 6/2006 | Barker et al. ............ | 252/518.1 |
| 7,390,472 B1 * | 6/2008 | Singhal et al. ........... | 423/306 |
| 2002/0039687 A1 * | 4/2002 | Barker et al. ............ | 429/231.95 |
| 2002/0059719 A1 * | 5/2002 | Hosoya et al. ........... | 29/623.1 |
| 2002/0086214 A1 * | 7/2002 | Barker et al. ............ | 429/232 |
| 2003/0077514 A1 * | 4/2003 | Barker et al. ............ | 429/221 |
| 2003/0129492 A1 * | 7/2003 | Barker et al. ............ | 429/221 |
| 2003/0170542 A1 * | 9/2003 | Barker et al. ............ | 429/231.9 |
| 2004/0086445 A1 * | 5/2004 | Armand et al. ........... | 423/306 |
| 2004/0126300 A1 * | 7/2004 | Barker et al. ............ | 423/306 |
| 2005/0196334 A1 * | 9/2005 | Saidi et al. .............. | 423/306 |
| 2005/0255026 A1 * | 11/2005 | Barker et al. ............ | 423/306 |
| 2008/0241690 A1 * | 10/2008 | Delacourt et al. ......... | 429/221 |

\* cited by examiner

*Primary Examiner*—Wayne Langel
(74) *Attorney, Agent, or Firm*—Ohlandt, Greeley, Ruggigero & Perle, L.L.P.

(57) ABSTRACT

A method for preparing a $Li_xM_yPO_4$ compound having an olivine structure includes: preparing a solution containing transition metal M ions, $Li^+$ ions and $PO_4^{3-}$ ions; drying the solution to form particles of a starting material; and forming the particles of the starting material into particles of the $Li_xM_yPO_4$ compound with an olivine structure, in which $0.8 \leq x \leq 1.2$ and $0.8 \leq y \leq 1.2$, and coating the particles of the $Li_xM_yPO_4$ compound with a carbon layer thereon.

18 Claims, 4 Drawing Sheets

METHOD FOR MAKING A LITHIUM MIXED METAL COMPOUND HAVING AN OLIVINE STRUCTURE

CROSS-REFERENCE TO RELATED APPLICATION

This application is a continuation-in-part of U.S. patent application Ser. No. 11/222,569 (hereinafter referred to as the '569 application), filed on Sep. 9, 2005 and abandoned as of the filing date of this application. The '569 application claims priority of Taiwanese application no. 094115023, filed on May 10, 2005.

BACKGROUND OF THE INVENTION

1. Field of the Invention

This invention relates to a method for making a lithium mixed metal compound, more particularly to a method for making a lithium mixed metal compound having an olivine structure and coated with a carbon layer thereon.

2. Description of the Related Art

Lithium-containing transitional metal compounds, such as layered cobalt compounds, layered nickel compounds and spinelle manganese compounds, have been developed for use in positive electrode active materials. However, the cobalt compounds, such as lithium cobalt oxide ($LiCoO_2$), are hardly applied to highly capacitive battery cells due to insufficient resources and poisonous property. The nickel compounds, such as lithium nickel oxide ($LiNiO_2$), are difficult to synthesize and are unstable. While the manganese compounds, such as lithium manganese oxide ($LiMnO_2$), are expected to be suitable for the highly capacitive battery cells because they are relatively economical and safe, they have low capacity, and are unstable and poor in cycle performance. In addition, when the cobalt compounds, nickel compounds and manganese compounds are applied to a battery cell, the initial capacity value of the cell will diminish during the first cycle operation and will further diminish upon every successive cycle of operation.

Another lithium-containing transitional metal compound, olivine lithium ferrous phosphate ($LiFePO_4$), has been considered for use in positive electrode active materials. The lithium ferrous phosphate has good electrochemical properties, good environmental and operational safety, sufficient resources, high specific capacity, cycle performance, and heat stability. Lithium ferrous phosphate has a slight twisted hexagonal close-packed structure that includes a framework consisting of $FeO_6$ octahedrals, $LiO_6$ octahedrals, and $PO_4$ tetrahedrals. In the structure of lithium ferrous phosphate, one $FeO_6$ octahedral is co-sided with two $LiO_6$ octahedrals and one $PO_4$ tetrahedral. However, since the structure of such lithium ferrous phosphate lacks continuous co-sided $FeO_6$ octahedral network, no free electrons can be formed to conduct electricity. In addition, since the $PO_4$ tetrahedrals restrict lattice volume change, insertion and escape of the lithium ions into and from the lattice of lithium ferrous phosphate are adversely affected, thereby significantly decreasing the diffusion rate of lithium ions. The conductivity and ion diffusion rate of lithium ferrous phosphate are decreased, accordingly.

Meanwhile, the smaller the particle size of the lithium ferrous phosphate, the shorter will be the diffusion path of the lithium ions, and the easier will be the insertion and escape of the lithium ions into and from the lattice of lithium ferrous phosphate, which is advantageous to enhance the ion diffusion rate. Besides, addition of conductive materials into the lithium ferrous phosphate is helpful in improving the conductivity of the lithium ferrous phosphate particles. Therefore, it has been proposed heretofore to improve the conductivity of the lithium ferrous phosphate through mixing or synthesizing techniques.

Currently, methods for synthesizing olivine lithium ferrous phosphate include high temperature-solid state reaction, carbothermal reduction, and hydrothermal reaction. For example, U.S. Pat. No. 5,910,382 discloses a method for making olivine compound $LiFePO_4$ powders by preparing intimate mixtures of stoichiometric proportions of $Li_2CO_3$ or $LiOH.H_2O$, $Fe\{CH_2COOH\}_2$ and $NH_4H_2PO_4.H_2O$, and heating the mixtures in a non-oxidizing atmosphere at an elevated temperature ranging from 650° C. to 800° C. However, the particle size of the resultant $LiFePO_4$ powders is relatively large, has an uneven distribution, and is not suitable for charge/discharge under a high electrical current. In addition, the ferrous source, i.e., $Fe\{CH_2COOH\}_2$, is expensive, which results in an increase in the manufacturing costs, accordingly.

U.S. Pat. Nos. 6,528,033, 6,716,372, and 6,730,281 disclose methods for making lithium-containing materials by combining an organic material and a mixture containing a lithium compound, a ferric compound and a phosphate compound so that the mixture is mixed with excess quantities of carbon coming from the organic material and so that ferric ions in the mixture are reduced to ferrous ions. The mixture is subsequently heated in a non-oxidizing atmosphere so as to prepare $LiFePO_4$ through carbothermal reduction. However, the methods provided by these prior art patents involve addition of a great amount of organic materials to the mixture, and excess quantities of carbon in $LiFePO_4$ tend to reduce ferrous ions to iron metal and result in loss of specific capacity.

All the aforesaid methods for making $LiFePO_4$ involve solid-state reaction and require long reaction time and a high temperature treatment. The $LiFePO_4$ powders thus formed have a relatively large particle size, a poor ionic conductivity, and a relatively high deteriorating rate in electrochemical properties. In addition, the $LiFePO_4$ powders thus formed are required to be ball-milled due to their large particle size, and the quality of the $LiFePO_4$ powders will deteriorate due to impurity pollution.

In addition, the method for making $LiFePO_4$ through hydrothermal reaction may use soluble ferrous compound, lithium compound, and phosphoric acid as starting materials, so as to control the particle size of $LiFePO_4$. However, hydrothermal reaction is relatively difficult to carry out since it requires to be conducted at a high temperature and a high pressure.

Therefore, there is still a need in the art to provide an economical and simple method for making a lithium mixed metal compound having a relatively small particle size and good conductivity.

SUMMARY OF THE INVENTION

Therefore, the object of the present invention is to provide a method for making a lithium mixed metal compound that can alleviate the aforesaid drawbacks of the prior art.

According to this invention, a method for preparing a $Li_xM_yPO_4$ compound having an olivine structure, includes: preparing a solution containing transition metal M ions, $Li^+$ ions and $PO_4^{3-}$ ions; drying the solution to form particles of a starting material; and forming the particles of the starting material into particles of the $Li_xM_yPO_4$ compound with an olivine structure, in which $0.8 \leq x \leq 1.2$ and $0.8 \leq y \leq 1.2$, and coating the particles of the $Li_xM_yPO_4$ compound with a carbon layer thereon.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

The preferred embodiment of a method for preparing a Li$_x$M$_y$PO$_4$ compound having an olivine structure according to this invention includes: preparing a solution containing transition metal M ions, Li$^+$ ions and PO$_4^{3-}$ ions; drying the solution to form particles of a starting material; and forming the particles of the starting material into particles of the Li$_x$M$_y$PO$_4$ compound with an olivine structure, in which $0.8 \leq x \leq 1.2$ and $0.8 \leq y \leq 1.2$, and coating the particles of the Li$_x$M$_y$PO$_4$ compound with a carbon layer thereon.

Non-limiting examples of the transition metal M of the transition metal M ions include at least one selected from the group consisting of Fe, Ti, V, Cr, Mn, Co, Ni, and combinations thereof.

Preferably, the formation of the Li$_x$M$_y$PO$_4$ compound and the carbon layer on the particles of the Li$_x$M$_y$PO$_4$ compound are conducted by heating the particles of the starting material in the presence of suspended carbon particles.

Figure 7:
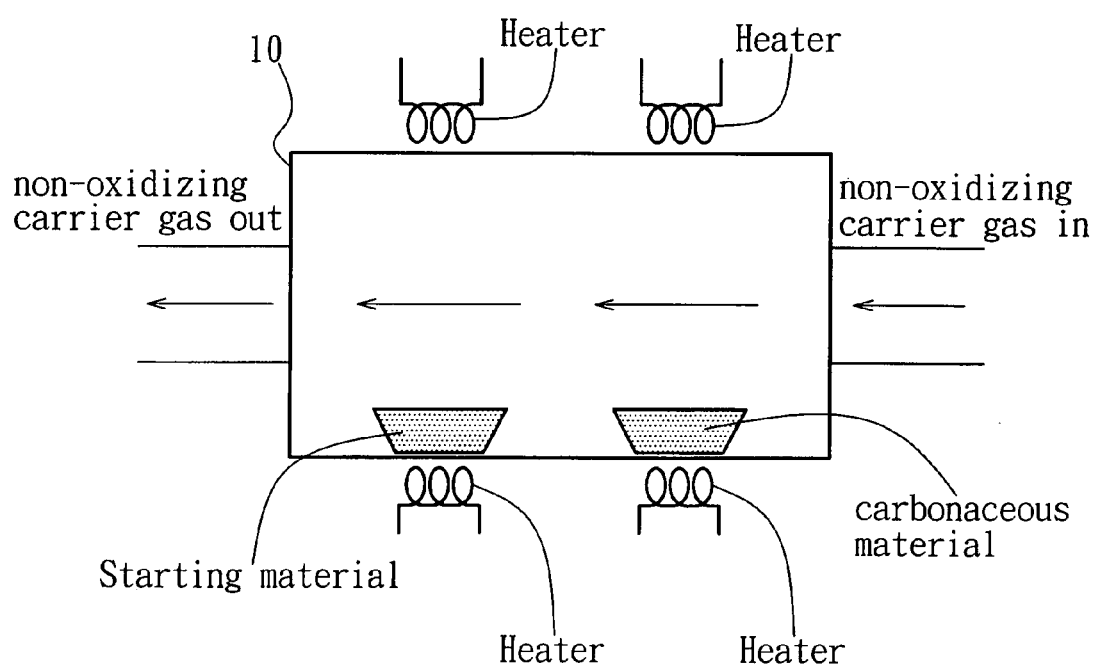
FIG. 7 is a schematic view to illustrate how reaction of making a lithium mixed metal compound coated with a carbon layer thereon is conducted in a reaction chamber in the first preferred embodiment of this invention.

Referring to FIG. 7, formation of the Li$_x$M$_y$PO$_4$ compound and coating of the Li$_x$M$_y$PO$_4$ compound with the carbon layer thereon are conducted in a reaction chamber 10. The atmosphere in the reaction chamber 10 is preferably a non-oxidizing atmosphere that consists of a non-oxidizing carrier gas.

In another preferred embodiment, the suspended carbon particles are formed by heating a carbonaceous material in the reaction chamber 10 to form carbon particles that are subsequently suspended in the reaction chamber 10 by the non-oxidizing carrier gas introduced into the reaction chamber 10 and passing over the heated carbonaceous material.

Preferably, the non-oxidizing carrier gas is inert to the starting material. Non-limiting examples of the non-oxidizing carrier gas include at least one selected from the group consisting of nitrogen, argon, carbon monoxide, carbon dioxide, and mixtures thereof. More preferably, the non-oxidizing carrier gas is nitrogen.

Non-limiting examples of the carbonaceous material include at least one selected from the group consisting of charcoal, graphite, carbon powders, coal, organic compounds, and mixtures thereof. Preferably, the carbonaceous material is charcoal.

In yet another preferred embodiment, the heating operation of the carbonaceous material in the reaction chamber 10 is conducted at a temperature higher than 300° C. Preferably, the carbonaceous material is heated at a temperature ranging from 300° C. to 1100° C. More preferably, the carbonaceous material is heated at 700° C.

In addition, the transition metal M ions may be prepared by dissolving a pre-mixture in water. Non-limiting examples of the pre-mixture include a compound of the transition metal M, powders of the transition metal M and an acid, and combinations thereof.

In one preferred embodiment, the pre-mixture is the compound of the transition metal M. More preferably, the compound of the transition metal M is a ferric or ferrous compound selected from the group consisting of ferric nitrate (Fe(NO$_3$)$_3$), ferric chloride (FeCl$_3$), and ferrous chloride (FeCl$_2$).

In another preferred embodiment, the pre-mixture includes powders of the transition metal M and an acid. Preferably, the powders of the transition metal M are iron powders.

The aforesaid acid may be chosen from one of an inorganic acid and an organic acid. Non-limiting examples of the inorganic acid include nitric acid (HNO$_3$), sulfuric acid (H$_2$SO$_4$), hydrochloric acid (HCl), perchloric acid (HClO$_4$), hypochlorous acid (HClO$_3$), hydrofluoric acid (HF), hydrobromic acid (HBrO$_3$), phosphoric acid (H$_3$PO$_4$), and mixtures thereof. In case that the pre-mixture includes the iron powders and one of nitric acid or hydrochloric acid, the transition metal M ions thus formed are ferric ions (Fe$^{3+}$). In case that the pre-mixture includes the iron powders and phosphoric acid, the transition metal M ions thus formed are ferrous ions (Fe$^{2+}$).

Non-limiting examples of the organic acid may be selected from the group consisting of formic acid (HCOOH), acetic acid (CH$_3$COOH), propionic acid (C$_2$H$_5$COOH), citric acid (HOOCCH$_2$C(OH)(COOH)CH$_2$COOH.H$_2$O), tartaric acid ((CH(OH)COOH)$_2$), lactic acid (CH$_3$CHOHCOOH), ascorbic acid, and mixtures thereof.

In one preferred embodiment, the Li$^+$ ions are prepared from a lithium compound. Non-limiting examples of the lithium compound include lithium hydroxide (LiOH), lithium fluoride (LiF), lithium chloride (LiCl), lithium oxide (Li$_2$O), lithium nitrate (LiNO$_3$), lithium acetate (CH$_3$COOLi), lithium phosphate (Li$_3$PO$_4$), lithium hydrogen phosphate (Li$_2$HPO$_4$), lithium dihydrogen phosphate (LiH$_2$PO$_4$), lithium ammonium phosphate (Li$_2$NH$_4$PO$_4$), lithium diammonium phosphate (Li(NH$_4$)$_2$PO$_4$), and mixtures thereof. Preferably, the lithium compound is lithium hydroxide (LiOH).

In another preferred embodiment, the PO$_4^{3-}$ ions are prepared from a phosphate compound. Non-limiting examples of the phosphate compound include ammonium hydrogen phosphate ((NH$_4$)$_2$HPO$_4$), ammonium dihydrogen phosphate ((NH$_4$)H$_2$PO$_4$), ammonium phosphate ((NH$_4$)$_3$PO$_4$), phosphorus pentoxide (P$_2$O$_5$), phosphoric acid (H$_3$PO$_4$), lithium phosphate (Li$_3$PO$_4$), lithium hydrogen phosphate (Li$_2$HPO$_4$), lithium dihydrogen phosphate (LiH$_2$PO$_4$), lithium ammonium phosphate (Li$_2$NH$_4$PO$_4$), lithium diammonium phosphate (Li(NH$_4$)$_2$PO$_4$), and mixtures thereof. Preferably, the phosphate compound is phosphoric acid (H$_3$PO$_4$).

In yet another preferred embodiment, a saccharide is added into the solution prior to drying of the solution. Non-limiting examples of the saccharide include sucrose, glycan, and polysaccharides. More preferably, the saccharide is sucrose.

The drying of the solution may be conducted using any method known to one skilled in the art. Non-limiting examples of the drying method include oven-drying, spray-drying and the like.

In addition, preferably, formation of the particles of the starting material into the particles of the $Li_xM_yPO_4$ compound and coating the particles of the $Li_xM_yPO_4$ compound with the carbon layer thereon are conducted at a temperature ranging from 400° C. to 1000° C. for 1 to 30 hours. More preferably, formation of the particles of the starting material into the particles of the $Li_xM_yPO_4$ compound and coating the particles of the $Li_xM_yPO_4$ compound with the carbon layer thereon are conducted at a temperature ranging from 450° C. to 850° C. for 4 to 20 hours. Most preferably, formation of the particles of the starting material into the particles of the $Li_xM_yPO_4$ compound and coating the particles of the $Li_xM_yPO_4$ compound with the carbon layer thereon are conducted at 700° C. for 12 hours.

EXAMPLES

Reactants and Equipments:
1. Ferric nitrate ($FeNO_3$): commercially obtained from C-Solution Inc., Taiwan;
2. Ferric chloride (FeCl): commercially obtained from C-Solution Inc., Taiwan;
3. Iron powders: commercially obtained from Hoganas Ltd., Taiwan, mode no. NC-100.24;
4. Nitrogen gas ($N_2$): commercially obtained from C-Solution Inc., Taiwan;
5. Nitric acid ($HNO_3$): commercially obtained from C-Solution Inc., Taiwan;
6. Hydrochloric acid (HCl): commercially obtained from C-Solution Inc., Taiwan;
7. Phosphoric acid ($H_3PO_3$): commercially obtained from C-Solution Inc., Taiwan;
8. Lithium hydroxide (LiOH): commercially obtained from Chung-Yuan chemicals, Taiwan;
9. Sucrose: commercially obtained from Taiwan Sugar Corporation, Taiwan;
10. Carbon black: commercially obtained from Pacific Energytech Co., Ltd., Taiwan;
11. Polyvinylidene difluoride (PVDF): commercially obtained from Pacific Energytech Co., Ltd., Taiwan; and
12. Tubular furnace: commercially obtained from Ultra Fine Technologies, Inc., Taiwan.

Example 1

0.2 mole of $FeCl_2$ was added to 200 ml of deionized water. After the $FeCl_2$ was completely dissolved in the deionized water, 0.2 mole of phosphoric acid and 100 ml of 2N LiOH solution was then added, so as to form a solution having a stoichiometric ratio 1:1:1 of $Fe^{2+}:Li^+:PO_4^{3+}$. The solution was dried into a powdery starting material, and was then placed in an aluminum oxide crucible. The crucible together with charcoal was placed in a tubular furnace which was heated at 700° C. for 12 hours in the presence of a nitrogen carrier gas charging into the furnace. Carbon particles formed from the charcoal were suspended in the nitrogen carrier gas. $LiFePO_4$ particles coated with a carbon layer were obtained.

Figure 1:
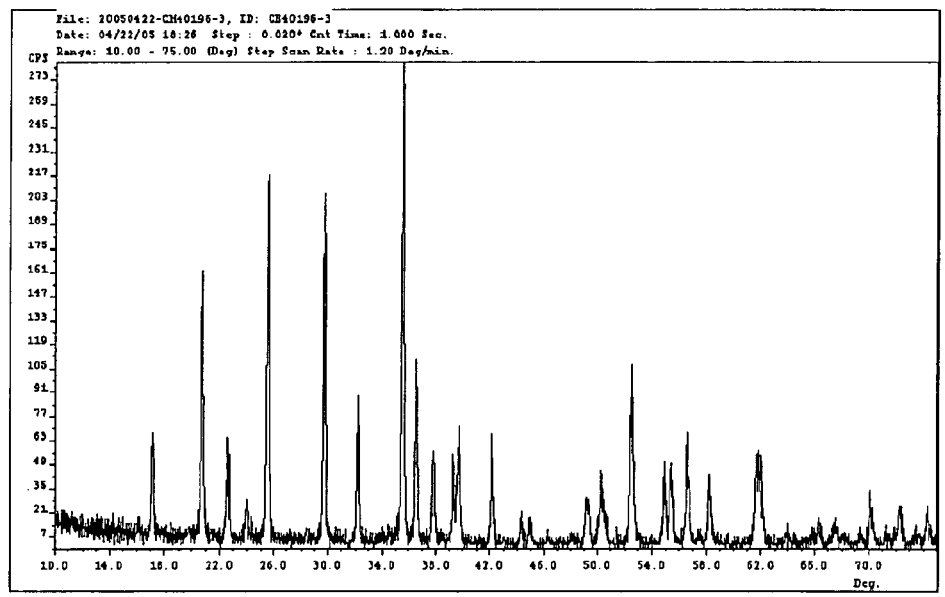
FIG. 1 shows the results of an X-ray diffraction pattern of the LiFePO$_4$ powders prepared according to Example 1 of the present invention.

The $LiFePO_4$ particles coated with the carbon layer were subsequently analyzed by CuKα X-ray diffraction analyzer (manufactured by SGS Taiwan Ltd., Taiwan) and the results are shown in FIG. 1. The X-ray pattern shown in FIG. 1 demonstrates that the $LiFePO_4$ particles coated with the carbon layer have an olivine crystal structure.

Example 2

In this example, the $LiFePO_4$ particles coated with a carbon layer were prepared in a manner similar to that of Example 1, except that 0.2 mole of $FeCl_2$ was replaced with 0.2 mole of $FeNO_3$.

Figure 2:
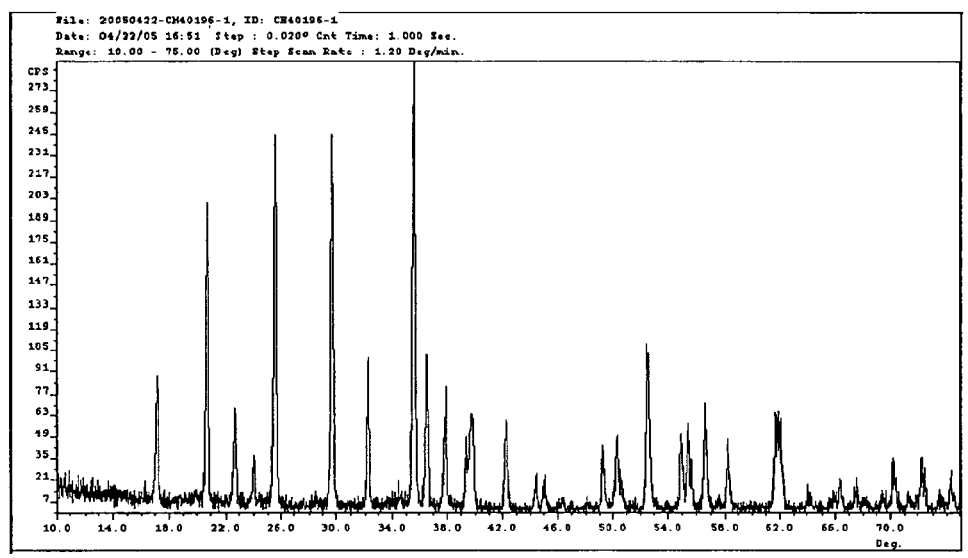
FIG. 2 shows the results of an X-ray diffraction pattern of the LiFePO$_4$ powders prepared according to Example 2 of the present invention.

The $LiFePO_4$ particles coated with the carbon layer were subsequently analyzed by CuKα X-ray diffraction analyzer, and the results are shown in FIG. 2. The X-ray pattern shown in FIG. 2 demonstrates that the $LiFePO_4$ particles have an olivine crystal structure.

Example 3

In this example, the $LiFePO_4$ particles coated with a carbon layer were prepared in a manner similar to that of Example 1, except that 0.2 mole of $FeCl_2$ was replaced with a mixture of 0.2 mole of iron powders and 50 ml of concentrated $HNO_3$.

Example 4

In this example, the $LiFePO_4$ particles coated with a carbon layer were prepared in a manner similar to that of Example 3, except that 50 ml of concentrated $HNO_3$ was replaced with 100 ml of concentrated HCl.

Example 5

In this example, the $LiFePO_4$ particles coated with a carbon layer were prepared in a manner similar to that of Example 3, except that 50 ml of concentrated $HNO_3$ was replaced with 0.2 mole of $H_3PO_4$.

Example 6

In this example, the $LiFePO_4$ particles coated with a carbon layer were prepared in a manner similar to that of Example 5, except that 3.2 g of sucrose was added to the reactant mixture before the reactant mixture was dried and heated.

Figure 3:
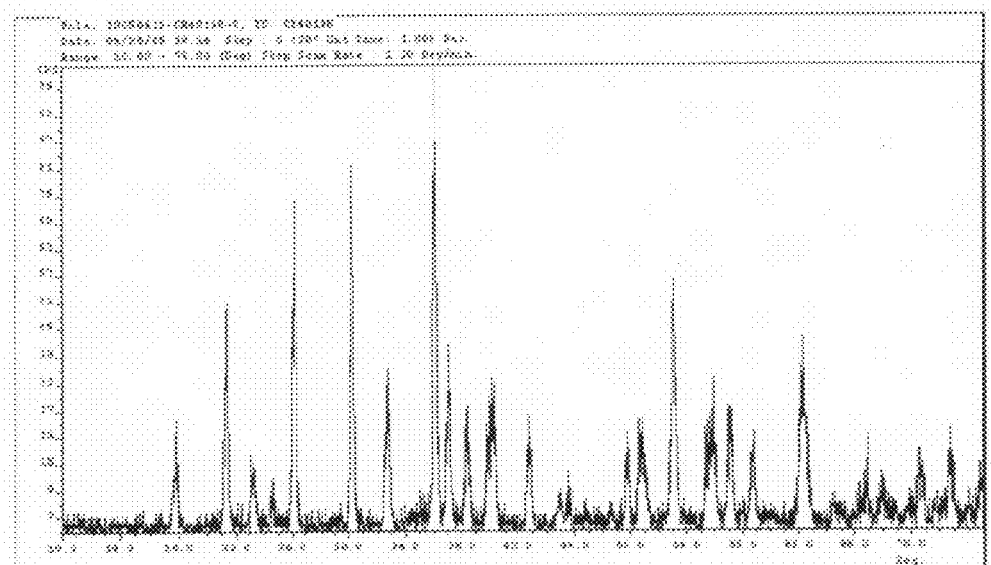
FIG. 3 shows the results of an X-ray diffraction pattern of the LiFePO$_4$ powders prepared according to Example 6 of the present invention.
Figure 4:
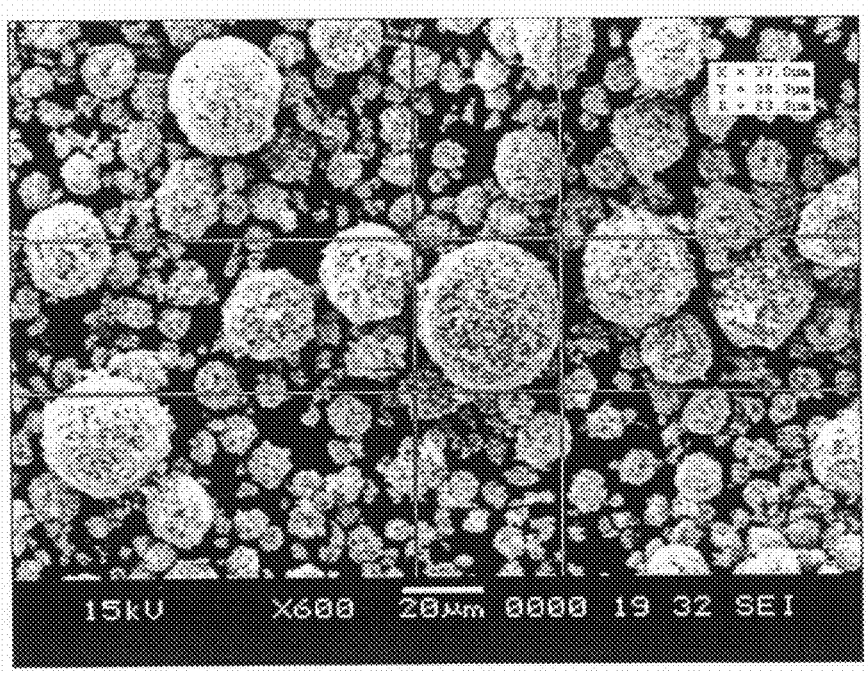
FIG. 4 shows a SEM photograph to illustrate surface morphology of the LiFePO$_4$ powders prepared according to Example 6 of the present invention.

The $LiFePO_4$ particles coated with the carbon layer were subsequently analyzed by CuKα X-ray diffraction analyzer and observed by scanning electron microscope (SEM), and the results are shown in FIGS. 3 and 4, respectively. The X-ray pattern shown in FIG. 3 and the photograph shown in FIG. 4 demonstrate that the $LiFePO_4$ particles have an olivine crystal structure and a particle size of about 100 nm.

Example 7

Figure 5:
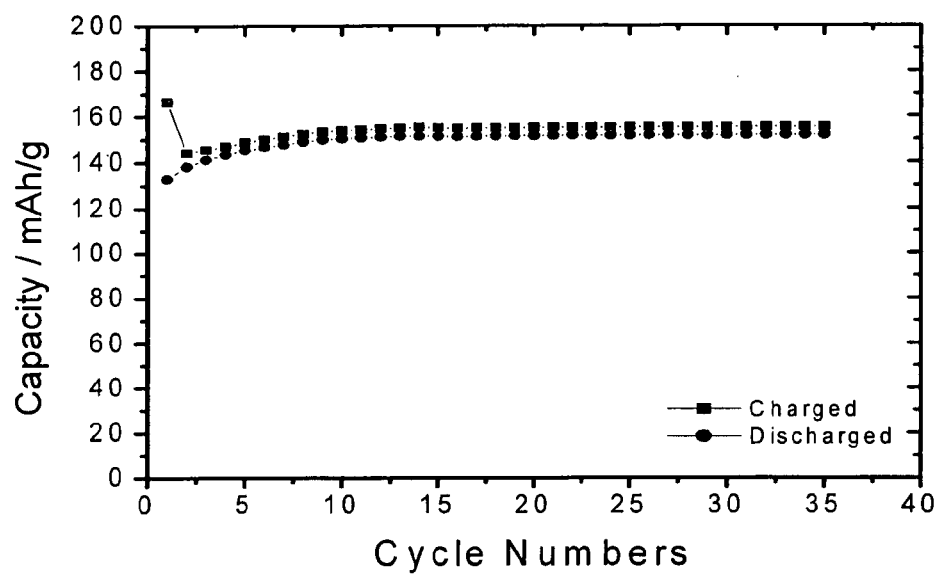
FIG. 5 shows a specific capacity/cycle number plot of a battery cell with cathode material made from the LiFePO$_4$ powders prepared according to Example 6 of the present invention.
Figure 6:
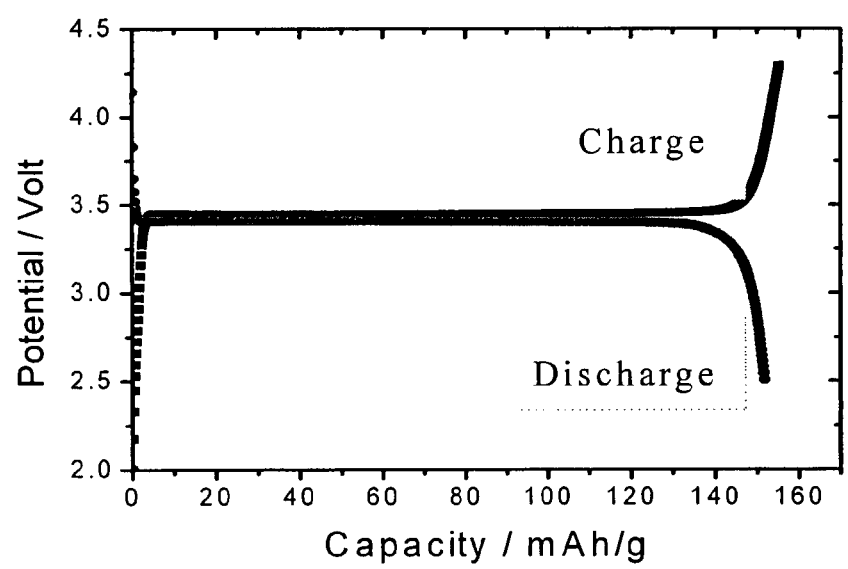
FIG. 6 shows a voltage/capacity plot of a battery cell with cathode material made from the LiFePO$_4$ powders prepared according to Example 6 of the present invention.

A mixture containing the $LiFePO_4$ particles obtained from Example 6, carbon black, and polyvinylidene difluoride (PVDF) in a ratio of 83:10:7 was prepared and mixed thoroughly. The mixture was subsequently coated on a piece of aluminum foil and was dried to form a cathode. The cathode was applied to a battery cell, and the battery cell was subjected to a charge/discharge test in a charge/discharge tester. The battery cell was charged and discharged at an approximate C/5 (5 hour) rate at a voltage ranging from 2.5 V and 4.5 V. The results of specific capacity variation are shown in FIG. 5. The results of voltage variation at the charge and discharge plateau in the $15^{th}$ cycle at room temperature are shown in FIG. 6. According to the results shown in FIG. 5, the initial specific capacity of the battery cell at room temperature is about 148 mAh/g, while after thirty cycles of charge/discharge operations, the specific capacity of the battery cell at room temperature reaches about 151 mAh/g. These results demonstrate that the battery cell has a good cycle stability. According to the results shown in FIG. 6, the charge/discharge performance and stability are improved.

In view of the foregoing, high temperature and high pressure operations utilized in the conventional methods are not required in the method of this invention. Besides, compared with the $LiFePO_4$ powder product obtained from the conventional methods, the $LiFePO_4$ particles coated with a carbon layer obtained according to the method of the present invention have a smaller particle size and more uniform particle size distribution, and the ball-milling treatment required in the conventional method can be omitted. Therefore, the method of this invention is more economical than the conventional methods in terms of production cost.

Additionally, by virtue of coating the $LiFePO_4$ particles with the carbon layer, the $LiFePO_4$ particles obtained according to the method of the present invention have enhanced electrical conductivity and capacity. Specifically, through coating with the carbon layer, the electrical conductivity of the $LiFePO_4$ particles will increase from around $10^{-8}$ MHO to around $10^{-4}$ MHO and the capacity of the $LiFePO_4$ particles will increase from around 10 mAh to around 140 mAh.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for preparing a $Li_xM_yPO_4$ compound having an olivine structure, the method comprising:
   preparing a solution containing transition metal M ions, $Li^+$ ions and $PO_4^{3-}$ ions;
   drying the solution to form particles of a starting material; and
   forming the particles of the starting material into particles of the $Li_xM_yPO_4$ compound with an olivine structure in a reaction chamber, in which $0.8 \leq x \leq 1.2$ and $0.8 \leq y \leq 1.2$, and coating the particles of the $Li_xM_yPO_4$ compound with a carbon layer thereon,
   wherein the formation of the $Li_xM_yPO_4$ compound and the carbon layer on the particles of the $Li_xM_yPO_4$ compound is conducted by heating the particles of the starting material in the presence of suspended carbon particles; and
   wherein the suspended carbon particles are formed by heating a carbonaceous material separated from the starting material in the reaction chamber to form carbon particles which are subsequently suspended in the reaction chamber by a non-oxidizing carrier gas introduced into the reaction chamber and passing over the heated carbonaceous material.

2. The method of claim 1, wherein the transitional Metal M of the transition metal M ions is at least one selected from the group consisting of Fe, Ti, V, Cr, Mn, Co, Ni, and combinations thereof.

3. The method of claim 1, wherein the non-oxidizing carrier gas is at least one selected from the group consisting of nitrogen, argon, carbon monoxide, carbon dioxide, and mixtures thereof.

4. The method of claim 1, wherein the carbonaceous material is at least one selected from the group consisting of charcoal, graphite, carbon powders, coal, organic compounds, and mixtures thereof.

5. The method of claim 1, wherein the heating operation of the carbonaceous material is conducted at a temperature ranging from 300° C. to 1100° C.

6. The method of claim 1, wherein the transition metal M ions are prepared by dissolving a pre-mixture in water, the pre-mixture including a compound of the transition metal M.

7. The method of claim 6, wherein the compound is a ferric compound selected from the group consisting of ferric nitrate and ferric chloride.

8. The method of claim 6, wherein the compound is ferrous chloride.

9. The method of claim 1, wherein the transition metal M ions are prepared by dissolving a pre-mixture in water, the pre-mixture including powders of the transition metal M and an acid.

10. The method of claim 9, wherein the powders are iron powders.

11. The method of claim 9, wherein the acid is an inorganic acid selected from the group consisting of nitric acid, sulfuric acid, hydrochloric acid, perchloric acid, hypochloric acid, hydrofluoric acid, hydrobromic acid, phosphoric acid, and mixtures thereof.

12. The method of claim 9, wherein the acid is an organic acid selected from the group consisting of formic acid, acetic acid, propionic acid, citric acid, tartaric acid, lactic acid, ascorbic acid, and mixtures thereof.

13. The method of claim 1, wherein the $Li^+$ ions are prepared from a lithium compound selected from the group consisting of lithium hydroxide, lithium fluoride, lithium chloride, lithium oxide, lithium nitrate, lithium acetate, lithium phosphate, lithium hydrogen phosphate, lithium dihydrogen phosphate, lithium ammonium phosphate, lithium diammonium phosphate, and mixtures thereof.

14. The method of claim 1, wherein the $PO_4^{3-}$ ions are prepared from a phosphate compound selected from the group consisting of ammonium hydrogen phosphate, ammonium dihydrogen phosphate, ammonium phosphate, phosphorus pentoxide, phosphoric acid, lithium phosphate, lithium hydrogen phosphate, lithium dihydrogen phosphate, lithium ammonium phosphate, lithium diammonium phosphate, and mixtures thereof.

15. The method of claim 1, further comprising adding a saccharide into the solution prior to drying of the solution.

16. The method of claim 15, wherein the saccharide is selected from the group consisting of sucrose, glycan, and polysaccharides.

17. The method of claim 1, wherein formation of the particles of the starting material into the particles of the $Li_xM_yPO_4$ compound and coating the particles of the $Li_xM_yPO_4$ compound with the carbon layer thereon are conducted at a temperature ranging from 400° C. to 1000° C. for 1 to 30 hours.

18. The method of claim 17, wherein formation of the particles of the starting material into the particles of the $Li_xM_yPO_4$ compound and coating the particles of the $Li_xM_yPO_4$ compound with the carbon layer thereon are conducted at a temperature ranging from 450° C. to 850° C. for 4 to 20 hours.

* * * * *